United States Patent

[11] 3,571,759

[72] Inventors Herbert Kroemer
Menlo Park, Calif.;
Alan H. Mac Pherson, New Providence, N.J.; Megha Shyam, Los Altos, Calif.
[21] Appl. No. 757,878
[22] Filed Sept. 6, 1968
[45] Patented Mar. 23, 1971
[73] Assignee Fairchild Camera and Instrument Corporation
Syosset, Long Island, N.Y.

[54] TRANSVERSE NEGATIVE MOBILITY DEVICES
10 Claims, 5 Drawing Figs.

[52] U.S. Cl. .......... 332/16, 307/304, 307/322, 317/235, 330/5, 331/107, 332/52
[51] Int. Cl. .......... H03c 3/22, H03b 7/06
[50] Field of Search .......... 332/16, 16 (T), 52; 331/107, 107 (G); 317/234—10; 330/5; 307/322, 304

[56] References Cited
UNITED STATES PATENTS
3,314,022 4/1967 Meitzler .......... 317/234-(10)
3,467,896 9/1969 Kroemer .......... 331/107GX
3,458,832 7/1969 McGraddy et al. .......... 317/234-(10)
OTHER REFERENCES
Ridley et al. - " A Bulk Differential Negative Resistance Due to Electron Tunneling through an Impurity Potential Barrier" - Physics letters p.300—302 Vol. 4, 1963-331-107G
Ridley - " Specific Negative Resistance in Solids" - Proc. Phys. Soc., 1963 vol. 82 p.954— 966 - 331-107G

*Primary Examiner*—Alfred L. Brody
*Attorneys*—Roger S. Borovoy and Alan H. Mac Pherson

ABSTRACT: In a properly cut sample of selectively doped semiconductor material, such as germanium, with a selected bias voltage applied along the longitudinal axis, a small transverse voltage applied across one end of the sample produces a transversely polarized domain, which, under the influence of the bias voltage, drifts along the longitudinal axis of the sample. Because the drift velocity is a function of the strength of the bias voltage, and because a pulse injected into the sample can be continuously recirculated at a frequency proportional to the drift velocity, an amplitude modulated signal can be used to vary the bias voltage thereby varying the recirculation frequency of the pulse. As a result, the device can be made to act as either a frequency or a phase modulator.

INVENTORS
HERBERT KROEMER
ALAN H. MACPHERSON
MEGHA SHYAM

BY Roger S. Burwey
ATTORNEY

TRANSVERSE NEGATIVE MOBILITY DEVICES

BACKGROUND OF THE INVENTION

1. Field of the Invention

This invention relates to semiconductor devices and, in particular, to signal modulators using semiconductor devices exhibiting transverse negative differential mobility.

2. Description of the Prior Art

Semiconductor devices containing peaks and valleys in their voltage-current characteristics are well known. Because of these characteristic peaks and valleys, these devices, when properly biased, exhibit a so-called negative resistance to small amplitude AC voltage perturbations in the direction of the bias field about the bias point. Thus, in a properly biased tunnel diode, a typical negative resistance device, a small increase in voltage produces a proportionate decrease in current. By properly choosing the bias voltage, this negative resistance effect, which is essentially a property of the interface between the P and the N type materials of the diode, can be used to make either a bistable device capable of exhibiting two different impedances, or an unstable device such as an oscillator.

As disclosed in copending application Ser. No, 757,879, filed Sept. 6, 1968, now Pat. No. 3,516,019, granted Jun. 2, 1970 by H. Kroemer and M. Shyam, and assigned to Fairchild Camera and Instrument Corporation, assignee of this invention, a sample of a selected semiconductor material can, under certain conditions, be made to exhibit a negative resistance in a direction perpendicular to that of an applied electric field rather than in the direction of the applied field. This so-called "transverse negative resistance" is not just a negative resistance to small signal perturbations about a DC bias point, but rather is a substantially linear negative resistance which passes through the zero of the transverse voltage-current characteristic. Moreover, this negative resistance is not a property of a semiconductor interface as in the case of the tunnel diode negative resistance, but rather is apparently a bulk field effect.

As disclosed by Kroemer and Shyam, to obtain this negative resistance, a sample of semiconductor material, typically germanium, is cut in a (110) plane with the longitudinal axis of the sample substantially aligned along a[110] crystal axis. Then, when a selected electric bias field is applied along the longitudinal axis, the sample exhibits a negative resistance in a direction perpendicular to the longitudinal axis of the sample.

Because of this transverse negative resistance, a small transverse voltage in one direction produces a corresponding transverse current in the opposite direction. This transverse current, once started, continues until a domain, formed by the accumulation and depletion of electrons on opposite sides of the sample, reaches its maximum value, that is, becomes fully "-polarized." Hereafter this domain is called a "transverse domain." Under the influence of the longitudinal bias field, this transverse domain travels, at a drift velocity on the order of 107cm./sec., along the longitudinal axis of the sample. Contacts placed on the sides of the sample downstream from the injection point can be used to detect the arrival of this domain.

Kroemer and Shyam disclose several circuits—including a shift register, a recirculating delay line and an oscillator-—which use the specially-cut semiconductor sample of their invention. These circuits all depend on the fact that a transverse domain created in the sample travels, under the influence of the bias field, along the longitudinal axis of the sample.

SUMMARY OF THE INVENTION

This invention likewise discloses a circuit which makes use of Kroemer's and Shyam's specially-cut samples of semiconductor material. But, in addition to making use of the fact that the transverse domains produced in these samples travel along the longitudinal axes of the samples, this invention also makes use of the additional fact that the drift velocities of these transverse domains are a function of the bias field strengths.

Thus, an output pulse once injected into a sample travels, under the influence of the bias field, the length of the sample in a time which is a function of the strength of the bias field. This pulse, when detected at output contacts on the sample, can be reshaped and fed back to the input contacts on the sample. The frequency of arrival of this pulse at the output contacts is a function of the strength of the bias field. As a result, by selectively varying this strength, Kroemer's and Shyam's specially-cut semiconductor sample can be used, with appropriate input, output, feedback, and bias circuitry, to convert amplitude-modulated signals into frequency-modulated signals.

According to one embodiment of this invention, the strength of the bias field is varied in response to an amplitude-modulated signal to convert the variations in amplitude of this signal into variations in the frequency of arrival at an output circuit of a recirculating pulse. Appropriately filtering the resulting frequency-modulated output pulse sequence produces a frequency-modulated sinusoid whose frequency is a function of the amplitude of the input signal. If the input signal is an amplitude modulated carrier signal, the frequency of the frequency-modulated sinusoid is a function of the amplitude of the envelope of this carrier.

The modulator of this invention is simple, yet rugged. Because this modulator makes use of bulk field properties, it is particularly useful in applications requiring high frequency responses around and above 10 megahertz and on up into the gigahertz frequency region. It is well suited for use with signals at microwave frequencies.

This invention will be more fully understood in light of the following detailed description taken together with the drawings.

DESCRIPTION OF THE PREFERRED EMBODIMENTS

Kroemer and Shyam, in the above cited application, discuss qualitatively one theory which explains the creation of transverse domains in specially cut samples of semiconductor material. The explanation in that application will not be repeated here but rather is incorporated here by reference. It suffices here to point out only that the transverse domains on which this invention is based exist when a sample of selectively doped semiconductor material—typically germanium—is cut in a (110) plane and when the longitudinal axis of the sample is aligned within ±3° with the [110] crystallographic axis of the semiconductor material. The phrase "cut in a (110) plane" means that at least one surface of the sample is parallel to a (110) plane within a cutting tolerance of about one-half degree. This plane in turn is perpendicular to a [110] axis. To obtain Kroemer's and Shyam's transverse domains, the sample must be doped with donor impurities in the range of $4\times10^{14}$ $cm^{13}$ to $1.5\times10^{15}cm^{13}$ and a bias voltage must be provided which produces an electric field along the longitudinal axis with a strength somewhere between 4 and 10 KV/cm.

Once a transverse domain has been created in a body of semiconductor material, the domain drifts along the longitudinal axis of the body in response to the influence of the longitudinal bias field. As the bias voltage changes, the domain drift velocity changes, FIGS. 1*a* and 1*b* show the relationship between these two variables.

Figure 1A:
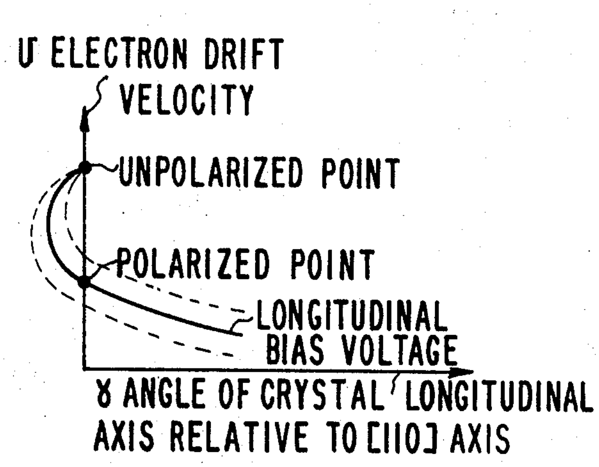
FIGS. 1*a* and 1*b* are useful in explaining the principles on which this invention is based.
Figure 1B:
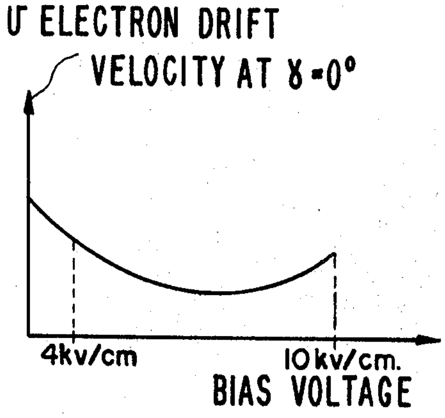

FIG. 1*a* plots electron drift velocity $v$ versus $\gamma$, the angle between the crystal longitudinal axis and the [11 ] crystal axis. Of interest is that at $\gamma$=0° the electron drift velocity has two values, one for the unpolarized point and the other for a polarized point; that is, for a point where the transverse domain exists in its final or "polarized" form. The curve shown in the solid line is associated with one particular longitudinal bias voltage. The curves shown in the dashed lines are associated with other bias voltages. Of importance is that the lowest electron drift velocity of a polarized domain occurs for a particular value of bias voltage in the midrange of the bias voltages for which the negative transverse mobility effect exists. Thus, as shown in FIG. 1*b*, which plots electron drift velocity $v$ at $\gamma=0°$ versus bias voltage, the electron drift velocity begins at a selected value for a selected minimum bias voltage of about 4 kilovolts per centimeter, then drops to a minimum value as the bias voltage increases and then increases again with increasing bias voltage. The maximum bias voltage of about 10 kilovolts per centimeter for which the transverse domains exist has an electron drift velocity associated with it slightly less than the electron drift velocity at the minimum bias voltage of about 4 kilovolts per centimeter for which these domains exist.

Figures 2, 3A:
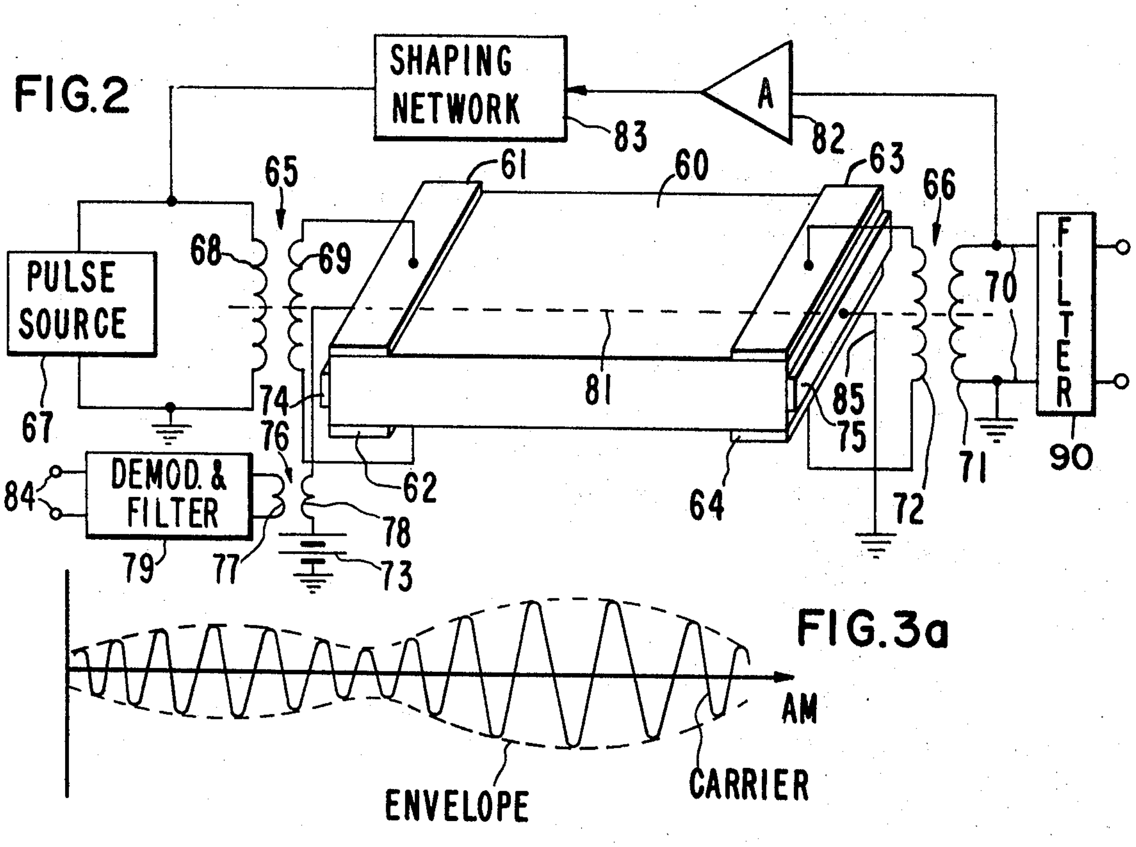
FIG. 2 shows a frequency modulator using the principles of this invention.
FIGS. 3*a* and 3*b* are graphs of use in explaining the operation of the embodiment shown in FIG 2.

FIG. 2 shows a frequency modulator using the principles of this invention. Here, body 60 of germanium, cut in the (110) plane with the longitudinal axis 81 of the body approximately aligned with the [110] axis of the germanium crystal, is doped with a suitable impurity—typically antimony—to obtain a doping concentration of approximately $5\times10^{14}$ per cubic centimeter. This concentration can vary from about $4\times10^{14}$ $cm^{13}$ to about $1.5\times10^{15}cm^{13}$. Metal input contacts 61 and 62 are alloyed to the left-hand side of body 60 while metal output contacts 63 and 64 are alloyed to the right-hand side of body 60. The secondary winding 69 of input transformer 65 has its two terminals connected or alloyed to contacts 61 and 62. The primary winding 72 of output transformer 66 has its two contacts connected or alloyed to contacts 63 and 64. A bias source 73, typically a battery, is alloyed or connected to bias contact 74 at the left end of body 60. A return path for the bias current is provided by lead 85 attached to bias contact 75 at the right-hand face of body 60. Bias contacts 74 and 75 can, if desired, be eliminated and the leads from bias source 73 connected directly to windings 69 and 72 provided the variation in bias voltage occurs at a low frequency relative to the pulse recirculation rate.

A transverse domain representing a pulse is placed in body 60 by applying a pulse from source 67 to the input winding 68 of transformer 65. The resulting pulse of transverse voltage produced across body 60 from contact 61 to contact 62 creates a transverse domain which then proceeds to travel along the longitudinal axis 81 of material 60 in response to the longitudinal bias voltage from source 73.

When this transverse domain arrives at output contacts 63 and 64, a pulse is produced in primary winding 72 of transformer 66. A corresponding pulse is produced in secondary winding 71 of this transformer. This pulse is then fed back by a path from the secondary winding 71 to the input or primary winding 68 on transformer 65. In the feedback path are placed amplifier 82 and shaping network 83 to amplify and reshape the pulse. By properly setting the gain in the feedback path, body 60 and the associated circuitry act as an oscillator. The pulse frequency at the output leads is determined by the strength of the bias field. By varying the bias voltage, the oscillating frequency can likewise be varied.

Transformer 76, the secondary winding 78 of which is connected in series with bias voltage source 73, allows the bias voltage to be varied as a function of time an amount proportional to the amplitude of an amplitude-modulated input signal. Thus, when an amplitude-modulated carrier signal is applied to input leads 84, the amplitude of this signal is coupled into the bias voltage circuit by primary winding 77 and secondary winding 78 of transformer 76. Demodulator and filter 79, both of well-known construction, are provided to ensure that only the envelope of an amplitude-modulated carrier signal, and not the carrier, affects the bias voltage and to compensate for signal distortion introduced by transformer 76.

Figure 3B:
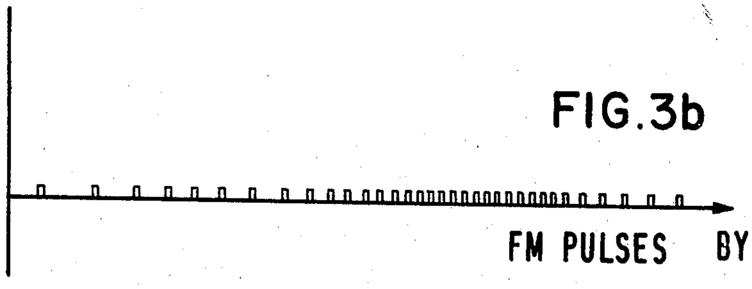

Because the secondary winding 78 of transformer 76 is coupled in series with bias source 73, the bias voltage along the longitudinal axis 81 of body 60 is varied in proportion to the envelope of the amplitude modulated signal supplied to leads 84. As a result, an amplitude-modulated signal, such as the one shown in FIG. 3*a* is converted into a series of frequency-modulated pulses such as shown in FIG. 3*b*. Filtering the resulting variable-frequency pulse sequence with an appropriate low pass or band-pass filter 90 produces a frequency-modulated sinusoid. The circuit thus is a frequency modulator.

By selecting the bias voltage from bias source 73 (FIG. 2) to operate on either the right-hand side or the left-hand side of the minimum point of the curve of FIG. 1*b*, one can convert positive amplitude variations of an amplitude-modulated signal into either negative frequency variations or positive frequency variations of a frequency modulated signal. If the bias voltage is selected to correspond to the minimum point of the curve of FIG. 1*b*, the output signal on leads 70 of the apparatus shown in FIG. 2 is merely an amplified version of the amplitude-modulated input signal from a source (not shown) connected to leads 84 of demodulator and filter 79.

While a frequency modulator using the principles of this invention has been described in detail, other frequency and phase modulator circuits using the principles of this invention will be obvious in view of this disclosure.

We claim:

1. A frequency modulator which comprises:

a body of selectively doped semiconductor substantially cut in a (110) plane with the longitudinal axis of said body corresponding within a selected number of degrees to a selected [110] axis of said material;

means for producing a bias field substantially along said longitudinal axis;

mans, responsive to a feedback signal, for producing a transverse domain in said body, said domain traveling along said longitudinal axis in response to said bias field;

means for producing an output pulse upon the arrival of said transverse domain at a selected position in said body;

means, responsive to said output pulse, for producing said feedback signal, and for transmitting said feedback signal to said means for producing said transverse domain; and means for varying the magnitude of said bias field along said longitudinal axis as a function of the amplitude of an input signal, thereby to control the time of arrival of said transverse domain at said selected position in said body and thereby to control the frequency of occurrence of said output pulse.

2. Apparatus as in claim 1 including:

means for filtering said output pulse thereby to produce a frequency-modulated output signal in response to an amplitude-modulated input signal.

3. Apparatus as in claim 1 in which said longitudinal axis corresponds within ±3° to the selected [110] axis of said material.

4. Apparatus as in claim 1 in which said semiconductor material is germanium.

5. Apparatus as in claim 4 in which said germanium contains a donor impurity in a concentration between $4\times10^{14}cm^{13}$ and $1.5\times10^{15}cm^{13}$.

6. Apparatus as in claim 5 in which said impurity is antimony.

7. Apparatus as in claim 1 in which said bias field has a strength between 4 and 10 kilovolts per centimeter along said longitudinal axis.

8. Apparatus which comprises:

means for producing an electric bias field;

a body of selectively doped semiconductor material with input and output contacts placed thereon and with said electric bias field aligned substantially along its longitudinal axis, said body containing at least one transverse domain which, under the influence of said bias field, travels along said longitudinal axis from said input contacts to said output contacts;

means for producing a transverse domain in the portion of said body adjacent said input contacts in response to the arrival of a transverse domain at said output contacts; and means for controllably varying the strength of said electric bias field, thereby to vary the travel time of a transverse domain through said body.

9. Apparatus as in claim 8 in which said body of selectively doped semiconductor material comprises:

a germanium crystal, cut in a (110) plane with the longitudinal axis of said crystal corresponding within three degrees to a selected [110] axis of said material, said germanium containing a donor impurity in a concentration between $4\times10^{14}cm^{13}$ and $1.5\times10^{15}cm^{13}$.

10. Apparatus as in claim 9 in which said electric bias field has a strength between 4 and 10 kilovolts per centimeter along the longitudinal axis of said body.